United States Patent
Op De Beeck et al.

(10) Patent No.: US 12,202,331 B2
(45) Date of Patent: Jan. 21, 2025

(54) FUEL TANK VENTING SYSTEM

(71) Applicant: Plastic Omnium Advanced Innovation and Research, Brussels (BE)

(72) Inventors: Joel Op De Beeck, Brussels (BE); Jules-Joseph Van Schaftingen, Brussels (BE); David Hill, Brussels (BE); Laurent Duez, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 18/565,615

(22) PCT Filed: Jun. 7, 2022

(86) PCT No.: PCT/EP2022/065315
§ 371 (c)(1),
(2) Date: Nov. 30, 2023

(87) PCT Pub. No.: WO2022/258565
PCT Pub. Date: Dec. 15, 2022

(65) Prior Publication Data
US 2024/0253456 A1    Aug. 1, 2024

(30) Foreign Application Priority Data

Jun. 7, 2021 (EP) .................................... 21178064
Jul. 9, 2021 (LU) ......................................... 500411

(51) Int. Cl.
*B60K 15/03* (2006.01)
*B60K 15/035* (2006.01)

(52) U.S. Cl.
CPC .. *B60K 15/035* (2013.01); *B60K 2015/03514* (2013.01); *B60K 2015/03576* (2013.01)

(58) Field of Classification Search
CPC ............ B60K 2015/03514; B60K 2015/03576
See application file for complete search history.

(56) References Cited

U.S. PATENT DOCUMENTS 5,813,434 A    9/1998  Horiuchi et al.
6,336,466 B1   1/2002  Ganachaud et al.
(Continued)

FOREIGN PATENT DOCUMENTS

CN    101270705 A    9/2008
CN    102953870 A    3/2013
(Continued)

OTHER PUBLICATIONS

International Search Report mailed on Oct. 7, 2022 in PCT/EP2022/065315 filed on Jun. 7, 2022 (3 pages).
(Continued)

*Primary Examiner* — P. Macade Nichols
(74) *Attorney, Agent, or Firm* — Oblon, McClelland, Maier & Neustadt, L.L.P.

(57) ABSTRACT

A fuel tank venting system for an automotive vehicle comprising: a fuel tank comprising a vapor dome, a refueling pipe, a fuel vapor trap that is connected to the fuel tank by an inlet conduit, wherein the inlet conduit is connected with the fuel tank through an orifice which is permanently open, the orifice being arranged in the vapor dome of the fuel tank in a static condition and a normally closed shutter device that communicates with the atmosphere and that is connected to the fuel vapor trap by an outlet conduit, the normally closed shutter device comprising an electrically-actuated valve being closed when the electrically-actuated valve is de-energized, wherein the normally closed shutter device is configured to be open during vehicle refueling process and to be closed when the fuel in the fuel tank reaches a predetermined fill level and when the vehicle is in normal operation.

20 Claims, 4 Drawing Sheets

(56) References Cited

U.S. PATENT DOCUMENTS

| | | |
|---|---|---|
| 2002/0074059 A1 | 6/2002 | Schaefer et al. |
| 2008/0230038 A1 | 9/2008 | Giacomazzi et al. |
| 2009/0236350 A1 | 9/2009 | Miura |
| 2009/0293849 A1 | 12/2009 | Kito et al. |
| 2013/0037007 A1 | 2/2013 | Reddy |
| 2015/0000772 A1 | 1/2015 | Onodera |
| 2016/0298576 A1 | 10/2016 | Reddy et al. |
| 2018/0087475 A1 | 3/2018 | Mills et al. |
| 2020/0198462 A1 | 6/2020 | Koukan et al. |
| 2021/0148309 A1 | 5/2021 | Villaire et al. |

FOREIGN PATENT DOCUMENTS

| | | |
|---|---|---|
| CN | 112824667 A | 5/2021 |
| EP | 1 020 670 A1 | 7/2000 |
| GB | 2588778 A | 5/2021 |
| JP | 9-112373 | 4/1997 |
| JP | 11-247730 | 9/1999 |
| JP | 2006-336495 A | 12/2006 |
| JP | 2009-226960 A | 10/2009 |
| JP | 2009-286201 A | 12/2009 |
| JP | 2015-6861 A | 1/2015 |

OTHER PUBLICATIONS

Japanese Office Action issued May 7, 2024 in corresponding Japanese Patent Application No. 2023-575457 (with English translation), 11 pages.

[Fig. 1]
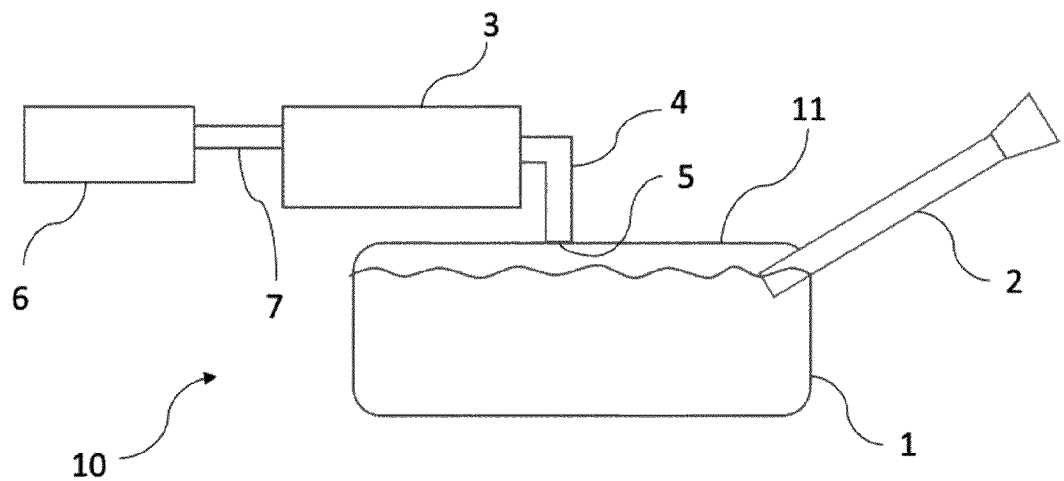
[Fig. 2]
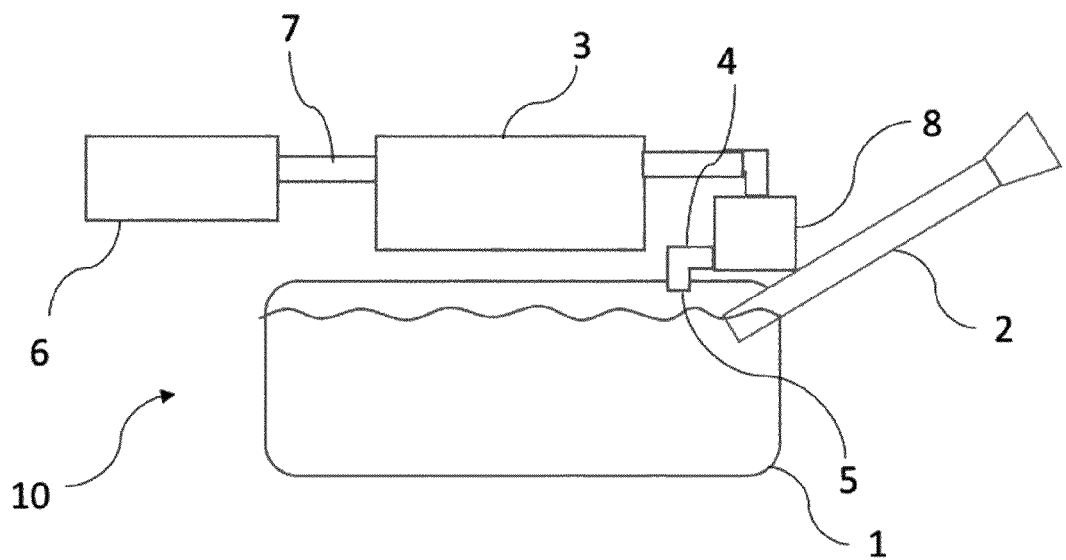

[Fig. 3]
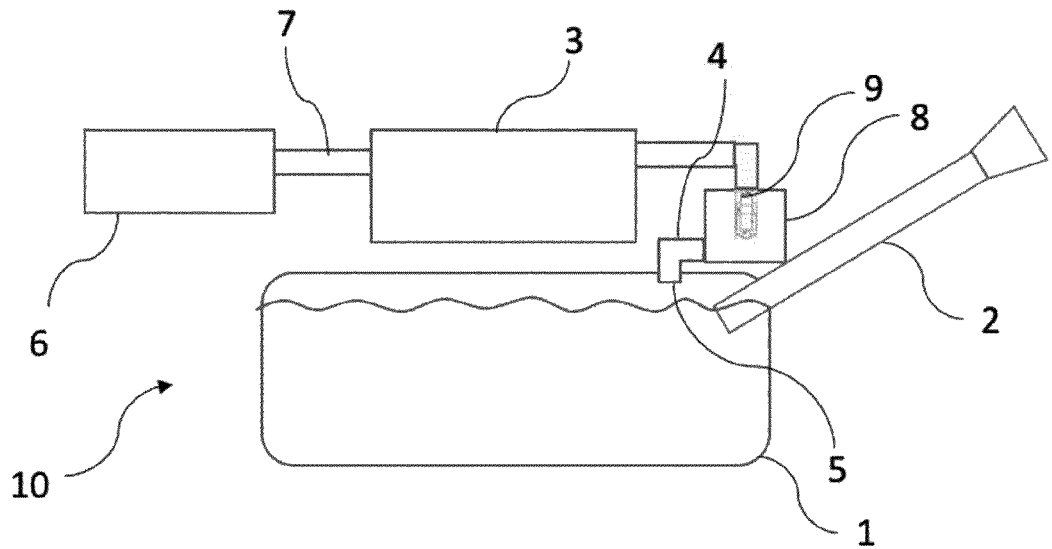
[Fig. 4]
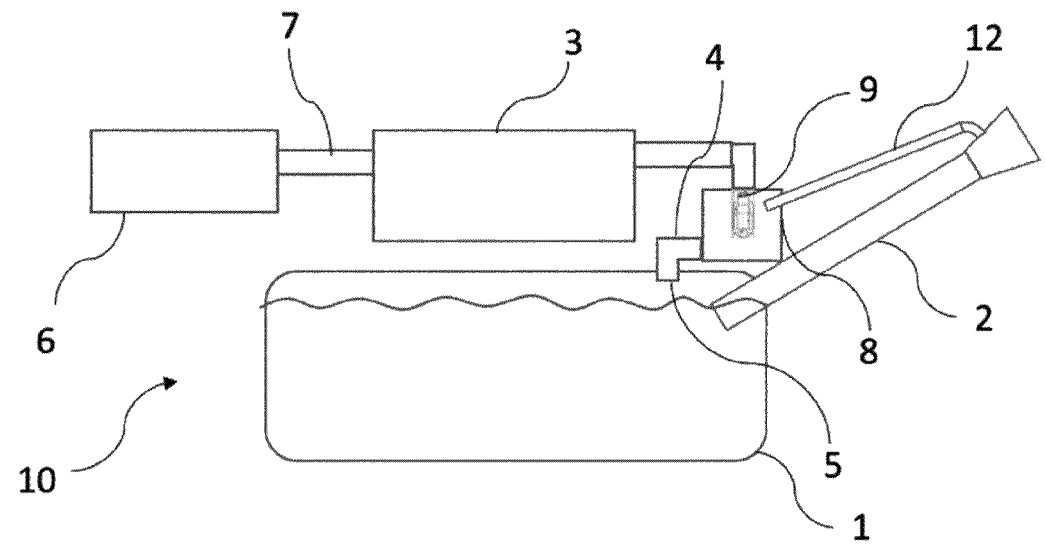

[Fig. 5]
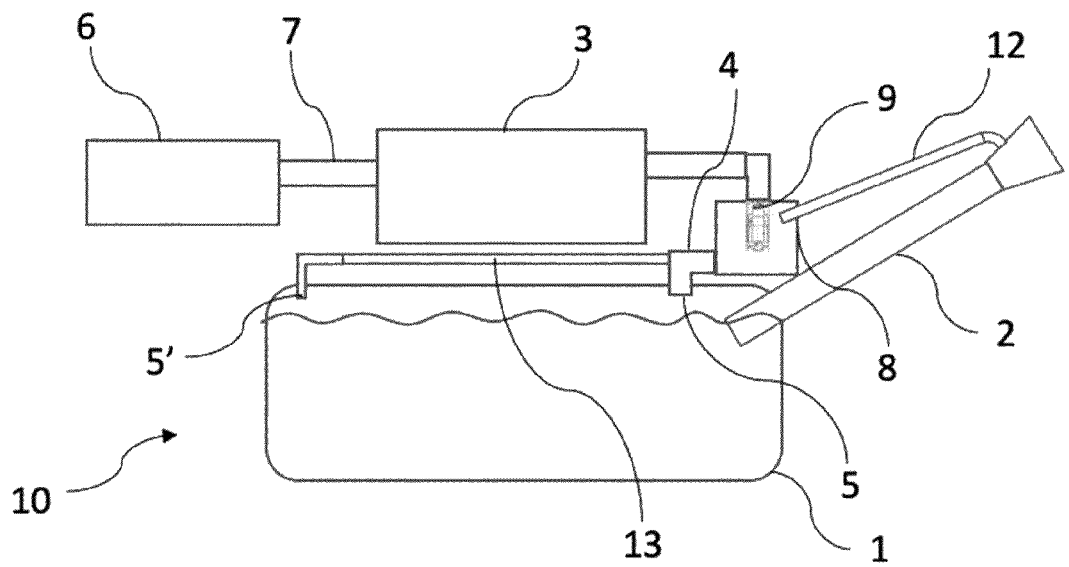
[Fig. 6]
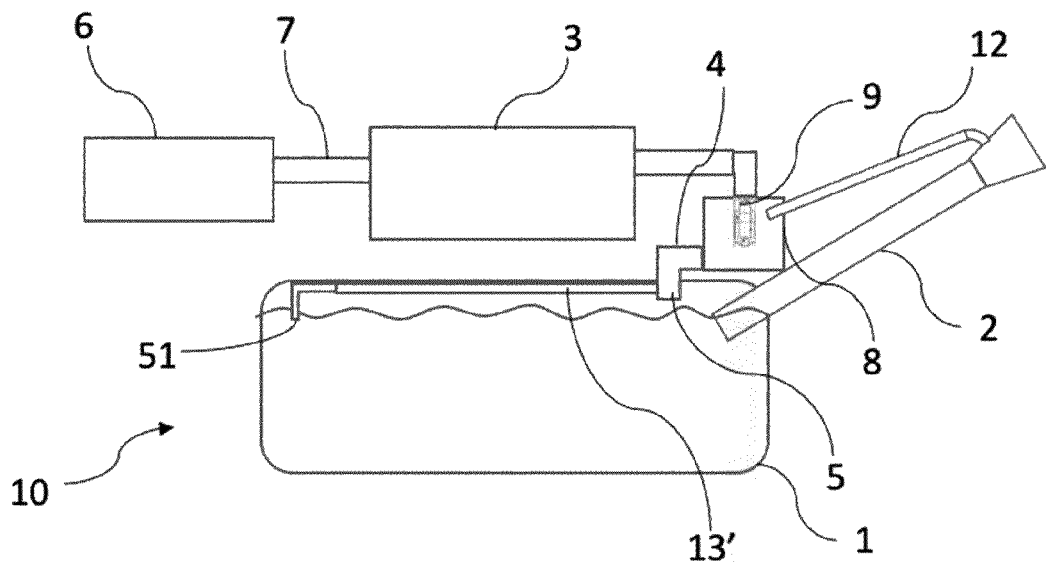

[Fig. 7]
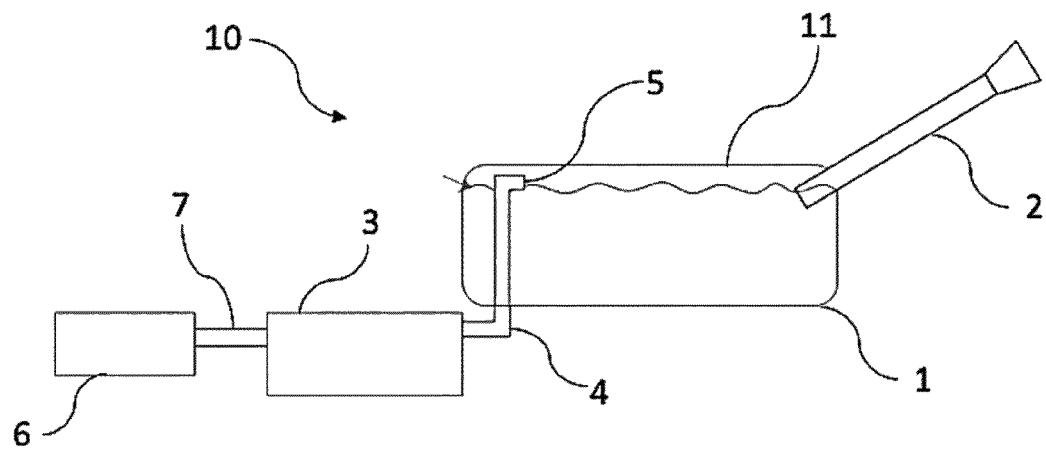
[Fig. 8]
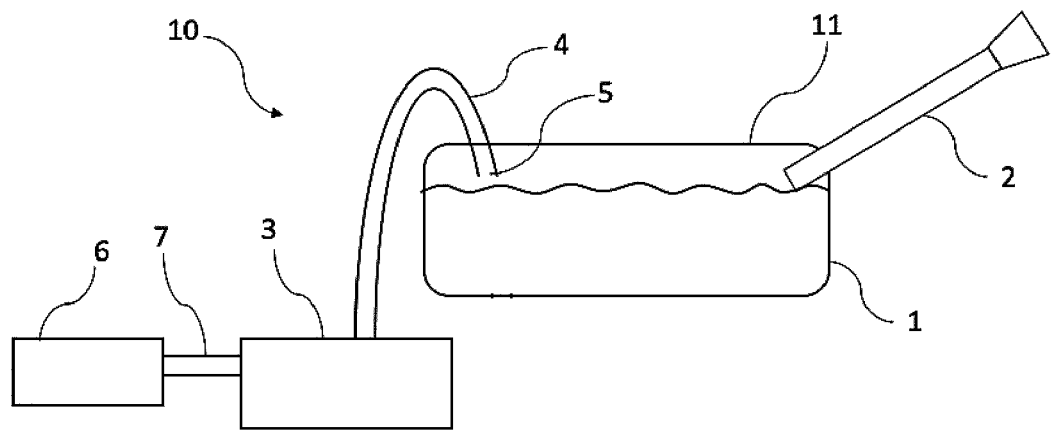

FUEL TANK VENTING SYSTEM

CROSS REFERENCE TO RELATED APPLICATIONS

This application is a National Stage entry under 35 U.S.C. § 371 of PCT/EP2022/065315, filed on Jun. 7, 2022 and claims priority to LU Patent Application No. 500411, filed on Jul. 9, 2021, and EP patent application Ser. No. 21/178, 064.8, filed on Jun. 7, 2021, the entire contents of which are incorporated herein by reference.

The invention relates to a fuel tank venting system for an automotive vehicle and an automotive vehicle comprising such a system. More precisely, the invention relates to on board refueling vapor recovery systems on automotive vehicle, especially on hybrid automotive vehicle.

Such type of fuel vapor recovery system has a fuel vapor trap, or canister, that captures fuel vapors, a refueling valve and one or more vent valves that are located at the top of the fuel tank for handling the fuel vapors in the fuel tank.

Among prior art documents, US 2020/0198462 A1 discloses a valve module for an operating fluid container system, GB 2 588 778 A discloses a vapor canister for a vehicular evaporative emissions control system, US 2018/0087475 A1 discloses a fuel tank system including an evaporative emissions control system, and US 2016/0298576 A1 discloses a fuel tank evaporative emissions control and diagnostic system.

For example, a Roll-Over Valve (ROV) is used to close the fuel system in case of a roll over event due to an accident of the vehicle; a fill limit vent valve (FLVV) is used to prevent overfilling of the tank. However, the use of these valves makes the fuel tank system very expensive and complicated to produce. In addition, the valves take a lot of place in the fuel system, especially inside the fuel tank, which means that the capacity of the tank can be unsatisfactory.

The object of the invention is to overcome the disadvantages of the known venting system by providing a fuel tank venting system that is cheaper, simpler and space saving especially inside the fuel tank.

The present invention thus provides a fuel tank venting system for an automotive vehicle comprising:
  a fuel tank comprising a vapor dome,
  a refueling pipe,
  a fuel vapor trap that is connected to the fuel tank by an inlet conduit, wherein the inlet conduit is connected with the fuel tank through at least one orifice which is permanently open, the orifice being arranged in the vapor dome of the fuel tank in a static condition, the orifice being preferably arranged in a wall of the fuel tank, more preferably arranged in a top wall of the fuel tank.
  a normally closed shutter device that communicates with the atmosphere and that is connected to the fuel vapor trap by an outlet conduit, the normally closed shutter device comprising an electrically-actuated valve being closed when the electrically-actuated valve is de-energized,
  wherein the normally closed shutter device is configured to be open during vehicle refueling process and to be closed when the fuel in the fuel tank reaches a predetermined fill level and when the vehicle is in normal operation. Normal operation means all the situations excepted the filling operation and in case of excessive over or under pressure.

Preferably, a pressure relief valve is located between the normally closed shutter device and the fuel vapor trap, said valve being positioned in parallel with the normally closed shutter device.

The entire fuel system is thus closed after refueling and during normal operation of the vehicle which contributes to the increase of the pressure in the fuel tank under the closed environment. It is known that the volatility of the fuel decreases when the pressure in the fuel tank increases. As a result, in a closed fuel tank system, no fuel vapor goes into the fuel vapor trap and nothing will be loaded on the fuel vapor trap.

The fuel tank venting system is particularly advantageous on a hybrid automotive vehicle to reduce $CO_2$ emission. Indeed, a hybrid automotive vehicle operates either by using only the electric motor, or only the engine, or both of them together, depending on the vehicle model. One particular principle of operation is as follows:
  during static condition (when the vehicle is not moving), the engine and the electric motor are both stopped;
  on starting, it is the electric motor that causes the car to move, up to higher speeds;
  when higher speeds are reached, the combustion engine takes over;
  in the event of hard acceleration, both the combustion engine and the electric motor are observed to operate simultaneously, thus making it possible to achieve acceleration equivalent to that of an engine having the same power, or even greater acceleration;
  during a stage of deceleration and braking, kinetic energy is eventually used for recharging the batteries, depending on the vehicle model.

Indeed, during a fuel vapor trap purge, vapors are sucked from the fuel vapor trap by engine air intake vacuum which occurs at low engine load. Thus, the combustion engine runs in a non-efficient operation mode; when the engine is completed with an electric motor, the aim is to avoid running the engine in non-efficient operation mode. Actually, during a Worldwide harmonized Light vehicles Test Cycles (WLTC) for example, it was found that when the hybrid engines do not operate in low load (non-efficient) mode, more fuel can be saved and $CO_2$ emissions are reduced; some plug-in hybrid vehicles do entirely switch off the combustion engine whenever possible in order to run purely in EV (electric vehicle) mode and without any $CO_2$ emission. In the latter specific case, it is important to avoid a fully loaded fuel vapor trap because it will need a purge by the engine and then in such a case, the engine would have to be switched on only for fuel vapor trap purging, which leads to unnecessary $CO_2$ emission.

In view of the above, the claimed fuel tank venting system allows a closed fuel tank system which helps to increase the pressure in the fuel tank and thus reduces the fuel vapor trap load, allowing to reduce $CO_2$ emission.

Moreover, on one hand, the valves such as ROV, OPV (Over Pressure Valve) or FLVV that are usually present in the prior art, are replaced by the at least one orifice in the claimed fuel tank venting system which frees more room for fuel. Thus, the capacity of the fuel tank is improved. On the other hand, the removal of the precited valves makes the fuel tank venting system simpler and cheaper.

We understand that the claimed at least one orifice, or vent, can be implemented by a simple connection between the fuel tank and the inlet conduit, such as a venting nipple which allows the passage of a liquid and a gas. There is no moving part arranged in the orifice for controlling the communication between the fuel tank and the inlet conduit.

Preferably, there is no moving part in the wall of the fuel tank. It is to be understood that the at least one orifice is configured to be not permanently submerged.

It is also understood that the inlet conduit is configured to maintain a permanent vapor communication between the fuel vapor trap and the fuel tank in a static condition. Static condition means that the vehicle is not moving and not refueling.

An optional feature of the invention is that the normally closed shutter device is open only during a vehicle refueling process or when the pressure in the fuel tank reaches a predetermined pressure level. Thus, the fuel tank venting system allows a closed fuel tank system which helps to increase the pressure in the fuel tank and thus reduces the fuel vapor trap load, allowing to reduce $CO_2$ emission, while avoiding a pressure in the fuel tank which exceeds the resistance of the fuel tank and may damage the fuel tank, i.e. while guaranteeing tank safety and avoiding its internal pressure becoming too extreme. The predetermined pressure level is thus predetermined as a pressure level when the vehicle is not in normal operation.

Another optional feature of the invention is that the electrically-actuated valve is open only during a vehicle refueling process. Thus, an active actuation of the normally closed shutter device, wherein the electrically-actuated valve is energized, is performed only during a vehicle refueling process.

Another optional feature of the invention is that the normally closed shutter device comprises one single electrically-actuated valve. Thus, the fuel tank venting system is cheaper and simpler, especially due to the fact that the control of the fuel tank venting system is simplified.

Another optional feature of the invention is that the fuel tank venting system comprises at least two orifices both connected to the inlet conduit by a venting pipe outside the fuel tank, the orifices being preferably arranged in different areas on the top wall of the fuel tank.

Thus, in case of large and/or complex tank, the inclination of the vehicle may lead the liquid level to one or several orifices in such a way that the orifices in question are immerged in the fuel. Orifices being arranged in different areas on the top wall of the fuel tank can make sure that at least one or some orifices still work when the fuel tank is inclined which permits to assure a permanent vapor communication between the fuel vapor dome and the fuel vapor trap. As the venting pipe is outside the fuel tank, there is more space inside the fuel tank. In addition, the assembly of the venting pipe with the tank is quite simple. Moreover, the cost of the fuel tank venting system can be reduced.

Another optional feature of the invention is that the fuel tank venting system comprises a venting pipe inside the fuel tank, the venting pipe being connected to the orifice and presenting at least one secondary orifice that is permanently open allowing a communication between the fuel tank and the inlet conduit.

Thus, an alternative solution is provided to resolve immersion risk of some orifices in case of inclination of the fuel tank which is not limited by any permeability requirement of the fuel vapor. As the venting pipe is inside the tank, the assembly of the fuel tank venting system on the vehicle is simplified and less permeation of the fuel vapor is occurred.

It can be understood that the inlet of the venting pipe for fuel vapor should advantageously be arranged in the vapor dome. Thus, when the venting pipe is inside the fuel tank and at least partially in contact with the liquid, the inlet orifice should be arranged above the maximum liquid level in the fuel tank, which means in the fuel tank vapor dome.

Still another optional feature of the invention is that the fuel tank venting system comprises a liquid vapor separator in the inlet conduit, the liquid vapor separator being arranged between the fuel vapor trap and the orifice, preferably above the maximum fuel level in the fuel tank. The liquid vapor separator is preferably above the liquid level in the fuel tank, even on an inclined slope. To this end, it is preferable to place the liquid vapor separator as high as possible.

In a preferred embodiment, the liquid vapor separator comprises at least one roll-over valve arranged in and above the maximum fuel level of the liquid vapor separator. The roll-over valve (ROV) is configured to shut down the communication between the fuel tank and the fuel vapor trap in case of line breakage or a Roll Over Event. With the ROV, the fuel is kept inside the fuel system and cannot be released to the atmosphere.

It is preferable to use a high flow roll-over valve which is able to accommodate the vapor flow in all conditions, such as refueling condition or some specific driving conditions with different temperatures and atmospheric pressures.

In a further preferred embodiment, the fuel vapor trap is placed in a venting zone that is configured in accordance with the geometry of the fuel tank in such a manner the fuel vapor trap always stays away from the fuel when the vehicle is inclined in any direction and of at least 12%, preferably up to 15% and even preferably up to 30%. For example, the fuel vapor trap is placed high enough above the fuel tank when the vehicle is on a flat surface. Also, the fuel vapor trap should have a gap with the fuel tank in a transversal direction to avoid being immerged when the fuel tank is inclined in any direction.

Another optional feature of the invention is that the fuel tank venting system comprises a recirculation line connecting the liquid vapor separator and a head of the refueling pipe to decrease the vapor generation in the tank and to reduce the fuel vapor trap load, allowing to reduce $CO_2$ emission.

Still another optional feature of the invention is that the fuel tank venting system comprises a level sensor inside the fuel tank capable of sending a signal when the fuel reaches a predetermined level, the signal being related to the shutdown of the normally closed shutter device.

The signal of level detecting can trigger the shutdown of the normally closed shutter device immediately or with a time delay. No other electronical device is need for controlling this action which is cost saving.

Alternatively, the system can work without any level sensor and the normally closed shutter device is time-controlled, the timer being calculated by fuel tank volume and the rate of the refueling.

Still another feature of the invention is that the normally closed shutter device comprises a pair of valves comprising an over-pressure relief (OPR) valve and an under-pressure relief (UPR) valve or a combined pressure/vacuum relief valve (PVRV) for guaranteeing tank safety and avoiding its internal pressure becoming too extreme.

The present invention provides also an automotive vehicle comprising a fuel tank venting system as described above.

BRIEF DESCRIPTION OF THE DRAWINGS

The present invention is illustrated in non-limiting manner by accompany FIGS. 1 to 7 which show certain preferred variants.

FIG. 1 is a schematic drawing of a fuel tank venting system in accordance with a first embodiment of the invention;

FIG. 2 is a schematic drawing of a fuel tank venting system in accordance with a second embodiment of the invention;

FIG. 3 is a schematic drawing of a fuel tank venting system in accordance with a third embodiment of the invention;

FIG. 4 is a schematic drawing of a fuel tank venting system in accordance with a forth embodiment of the invention;

FIG. 5 is a schematic drawing of a fuel tank venting system in accordance with a fifth embodiment of the invention;

FIG. 6 is a schematic drawing of a fuel tank venting system in accordance with a sixth embodiment of the invention;

FIG. 7 is a schematic drawing of a fuel tank venting system in accordance with a seventh embodiment of the invention;

FIG. 8 is a schematic drawing of a fuel tank venting system in accordance with a eighth embodiment of the invention.

DETAILED DESCRIPTION OF PREFERRED EMBODIMENTS

Referring to FIG. 1, a fuel tank venting system 10 for an automotive vehicle in accordance with a first embodiment of the invention includes a fuel tank 1, a refueling pipe 2 that is closed by a fuel cap, a fuel vapor trap 3, for example a canister containing activated charcoal, carbon, or other material that absorbs and desorbs fuel vapors. The fuel vapor trap 3 thus receives and stores fuel vapors from the fuel tank 1 and then delivers these stored fuel vapors to a fuel charge device for combustion in the vehicle engine. The fuel vapor trap 3 is connected to the fuel tank 1 by an inlet conduit 4.

In this embodiment, the inlet conduit 4 is connected with the fuel tank 1 only through one orifice 5 which is permanently open when the vehicle is in static condition. Thus, the inlet conduit 4 is configured to maintain a permanent vapor communication between the fuel vapor trap 3 and the fuel tank 1 in a static condition. The orifice 5 is arranged in a top wall 11 of the fuel tank 1 so that the orifice 5 is not permanently submerged in the liquid. Preferably, the orifice 5 is carried by a venting connection capable of connecting the inlet conduit 4 to the fuel tank 1. For example, the venting connection can be a venting nipple fixed on a tank wall.

In addition, the fuel vapor trap 3 is connected to a normally closed shutter device 6 configured to communicate with the atmosphere. The normally closed shutter device 6 is connected to the fuel vapor trap 3 by an outlet conduit 7. The normally closed shutter device 6 comprises an electrically-actuated valve, in particular one single electrically-actuated valve, for example a solenoid valve, being closed when the electrically-actuated valve is de-energized. The normally closed shutter device 6 is configured to be open during vehicle refueling process and to be closed when the fuel in the fuel tank 1 reaches a predetermined fill level and when the vehicle is in normal operation. In other words, the normally closed shutter device 6 is open only during vehicle refueling process. Alternatively, the normally closed shutter device 6 is open only in the following cases: a first case, during vehicle refueling process, and a second case, when the pressure in the fuel tank 1 reaches a predetermined pressure level. In the second case, the vehicle is not in normal operation. Such a predetermined pressure level is for example an over-pressure or an under-pressure compared to the ambient pressure, which is for example determined relatively to the pressure resistance of the fuel tank 1. An over-pressure is for example selected between 0, 3 bar and 1 bar above the ambient pressure, and may occur for example in summer when the vehicle is stopped for a long time in a sunny area. An under-pressure is for example selected between −0, 1 bar and −0, 3 bar below the ambient pressure. In order to open the normally closed shutter device 6 in the second case, i.e. when the pressure in the fuel tank 1 reaches a predetermined pressure level, the normally closed shutter device 6 comprises a passive valve, for example a mechanically-actuated valve, which is opened passively when the predetermined pressure level is reached, i.e. which opens under the effect of the pressure difference between the ambient pressure and the pressure in the fuel tank, and which is otherwise closed passively, i.e. when the predetermined pressure level is not reached or no more reached. For example, the electrically-actuated valve and the passive valve are arranged in parallel, each connecting the outlet conduit 7 to the atmosphere, when opened. For example, as a passive valve, the normally closed shutter device comprises a pair of valves comprising an over-pressure relief (OPR) valve and an under-pressure relief (UPR) valve or a combined pressure/vacuum relief valve (PVRV) for guaranteeing tank safety and avoiding its internal pressure becoming too extreme. In any case, the electrically-actuated valve 6 is open only during vehicle refueling process. Thus, an active actuation of the normally closed shutter valve, wherein the electrically-actuated valve is energized, is performed only during a vehicle refueling process.

The fuel tank venting system can comprise a level sensor inside the fuel tank 1 capable of sending a signal when the fuel reaches a predetermined level, the signal being related to the shutdown of the normally closed shutter device 6.

Referring to FIG. 2, a second embodiment of the invention is disclosed. Besides the features already described in the first embodiment, the fuel tank venting system comprises a liquid vapor separator (LVS) 8 in the inlet conduit 4, the liquid vapor separator 8 being arranged between the fuel vapor trap 3 and the orifice 5. In this embodiment, the liquid vapor separator 8 is arranged above the maximum fuel level in the fuel tank 1.

There are mainly two types of LVS: those referred to as "passive", for example known from Patent EP 1 020 670 in the name of the Applicant, which comprise in their base a simple valve that opens under the effect of the weight of liquid that they contain; and those referred to as "active", for example known from U.S. Pat. No. 6,698,475, which are drained by means of an active device (a pump, for example a jet pump).

Referring to FIG. 3, a third embodiment of the invention is disclosed. Besides the features already described in the second embodiment, the fuel tank venting system comprises a roll-over valve 9 that is arranged in the liquid vapor separator 8. The roll-over valve 9 performs a function of closing the fuel tank 1 automatically as soon as the latter begins to be overturned. For example, the roll-over valve comprises a high-density ball device resting in a cage, the bottom of which has a conical shape so that when the ball is displaced, it pushes upwards a valve capable of shutting off the inlet conduit 4 leading to the fuel vapor trap 3. In this embodiment, the roll-over valve 9 is arrange above the maximum fuel level of the liquid vapor separator 8.

FIG. 4 illustrates a fourth embodiment of the invention in which a recirculation line 12 is used to connect the liquid vapor separator 8 and a head of the refueling pipe 2 to decrease the vapor generation in the fuel tank 1.

FIG. 5 illustrates a fifth embodiment of the invention which is an improvement of the fourth embodiment for use of large and/or complex fuel tank. In this embodiment, the fuel tank 1 comprises a second orifice 5'. The two orifices 5, 5' are arranged in different areas on the top wall 11 of the fuel tank 1 and both orifices 5, 5' are connected to the inlet conduit 4 by a venting pipe 13. In this embodiment, the venting pipe 13 communicating with the orifices 5, 5' and the LVS 8 is arranged outside the fuel tank 1.

An alternative of the fifth embodiment is illustrated by FIG. 6 wherein the fuel tank venting system comprises a venting pipe 13' inside the fuel tank 1. The venting pipe 13' is connected to an orifice 5 arrange on the top wall 11 of the fuel tank 1. Moreover, the venting pipe 13' comprises one secondary orifice 51 that is permanently open. Thus, both of the orifice 5 and the secondary orifice 51 communicate with the inlet conduit 4 through the venting pipe 13'.

Preferably, the fuel vapor trap 3 is placed in a venting zone that is configured in accordance with the geometry of the fuel tank 1 in such a manner the fuel vapor trap 3 always stays away from the fuel when the vehicle is inclined in any direction and of at least 12%, preferably up to 15% and even preferably up to 30%. In the embodiments that are described above, the LVS 8 is place higher than the liquid level in the fuel tank 1. However, as long as the orifice and the secondary orifice are placed in the vapor dome, the inlet conduit 4 can be arranged inside the fuel tank and in contact with the liquid. In this case and as represented in FIG. 7, the LVS 8 and the fuel vapor trap 6 can be arranged below the fuel tank 1 and lower to the liquid level. Alternatively, and for a better protection of the fuel vapor trap 6, the inlet conduit 4 may have a U shape as shown in FIG. 8, the inlet conduit having a shape with an elevation point configured to impeach the liquid fuel to go in the fuel trap. In this manner, no liquid will be able to enter the fuel vapor trap 6 which avoids contamination of the fuel vapor trap 6 with fuel liquid.

REFERENCE LIST

1: fuel tank
2: refueling pipe
3: fuel vapor trap
4: inlet conduit
5, 5': orifice
6: normally closed shutter device
7: outlet conduit
8: liquid vapor separator
9: roll-over valve
10: fuel tank venting system
11: top wall
12: recirculation line
13, 13': venting pipe
51: secondary orifice

The invention claimed is:

1. A fuel tank venting system for an automotive vehicle, comprising:
a fuel tank comprising a vapor dome;
a refueling pipe; and
a fuel vapor trap connected to the fuel tank by an inlet conduit;
wherein the inlet conduit is connected with the fuel tank through an orifice which is permanently open,
wherein the orifice is arranged in the vapor dome of the fuel tank in a static condition,
wherein the fuel tank venting system further comprises:
a normally closed shutter device that communicates with the atmosphere and that is connected to the fuel vapor trap by an outlet conduit,
wherein the normally closed shutter device comprises an electrically-actuated valve being closed when the electrically-actuated valve is de-energized, and
wherein the normally closed shutter device is configured to be open during vehicle refueling process and to be closed when fuel in the fuel tank reaches a predetermined fill level and when the vehicle is in normal operation.

2. The fuel tank venting system according to claim 1, wherein the inlet conduit is configured to maintain a permanent vapor communication between the fuel vapor trap and the fuel tank in a static condition.

3. The fuel tank venting system according to claim 1, wherein the normally closed shutter device is open only during a vehicle refueling process or when a pressure in the fuel tank reaches a predetermined pressure level.

4. The fuel tank venting system according to claim 1, further comprising at least two orifices
wherein the orifices are connected to the inlet conduit by a venting pipe outside the fuel tank.

5. The fuel tank venting system according to claim 1, further comprising a venting pipe inside the fuel tank,
wherein the venting pipe is connected to the orifice and presenting at a secondary orifice that is permanently open.

6. The fuel tank venting system according to claim 4, wherein one of the orifices is carried by a venting connection capable of connecting the inlet conduit to the fuel tank.

7. The fuel tank venting system according to claim 1, further comprising a liquid vapor separator in the inlet conduit,
wherein the liquid vapor separator is arranged between the fuel vapor trap and the orifice.

8. The fuel tank venting system according to claim 7, wherein the liquid vapor separator comprises a roll-over valve arranged in and above the maximum fuel level of the liquid vapor separator.

9. The fuel tank venting system according to claim 1, wherein the fuel vapor trap is placed in a venting zone that is configured in accordance with the geometry of the fuel tank in such a manner the fuel vapor trap always stays away from the fuel when the vehicle is inclined in any direction and of at least 12%.

10. The fuel tank venting system according to claim 7, further comprising a recirculation line connecting the liquid vapor separator and a head of the refueling pipe.

11. The fuel tank venting system according to claim 1, comprising a level sensor inside the fuel tank capable of sending a signal when fuel reaches a predetermined level, the signal being related to the shutdown of the normally closed shutter device.

12. The fuel tank venting system according to claim 1, wherein the normally closed shutter device comprises a pair of valves comprising an over-pressure relief (OPR) valve and an under-pressure relief (UPR) valve or a combined pressure/vacuum relief valve (P/VRV).

13. An automotive vehicle comprising the fuel tank venting system according to claim 1.

14. The fuel tank venting system according to claim 1, wherein the orifice is arranged in a wall of the fuel tank.

15. The fuel tank venting system according to claim 1, wherein the orifice is arranged in a top wall of the fuel tank.

16. The fuel tank venting system according to claim 4, wherein the orifices are arranged in different areas on the top wall of the fuel tank.

17. The fuel tank venting system according to claim 6, wherein the venting connection is fixed on a tank wall.

18. The fuel tank venting system according to claim 7, wherein the liquid vapor separator is arranged above the maximum fuel level in the fuel tank.

19. The fuel tank venting system according to claim 9, wherein the fuel vapor trap is placed in a venting zone that is configured in accordance with the geometry of the fuel tank in such a manner the fuel vapor trap always stays away from the fuel when the vehicle is inclined in any direction up to 15%.

20. The fuel tank venting system according to claim 9, wherein the fuel vapor trap is placed in a venting zone that is configured in accordance with the geometry of the fuel tank in such a manner the fuel vapor trap always stays away from the fuel when the vehicle is inclined in any direction up to 30%.

* * * * *